United States Patent

[11] 3,599,767

[72] Inventor David N. Sederquist
  2727 #3 Midtown Court, Palo Alto, Calif. 94303
[21] Appl. No. 41,419
[22] Filed May 28, 1970
[45] Patented Aug. 17, 1971

[54] REVERSIBLE SPRAG CLUTCH
  8 Claims, 4 Drawing Figs.
[52] U.S. Cl. .................................................. 192/43.1,
  192/41 A, 192/45.1
[51] Int. Cl. ...................................................... F16d 41/08
[50] Field of Search............................................ 192/41 A,
  43, 43.1, 45.1; 188/82.2, 82.8; 81/63.1, 62, 59.1

[56] References Cited
UNITED STATES PATENTS
2,404,092 7/1946 Reynolds........................ 192/45.1
2,707,540 5/1955 Morris............................ 192/45.1
2,981,389 4/1961 Kilness.......................... 192/43.1 X
3,233,481 2/1966 Bacon............................ 81/63

3,372,612 3/1968 Rozmus........................... 81/62

Primary Examiner—Allan D. Herrmann
Attorney—Fryer, Tjensvold, Feix, Phillips & Lempio ABSTRACT: A reversible sprag clutch has a plurality of sprags disposed between spaced, opposed circular surfaces of two concentric members forming races for convex-convex contact wherein each of the sprags has two distinct inner cam surfaces, one of which inner cam surfaces can be employed to prevent relative clockwise rotation between the concentric members and the other of which inner cam surfaces can be employed to prevent counterclockwise rotation of the concentric members. These sprags are so constructed that the clutch transmitting torque in one direction will allow unrestricted rotation in the opposite direction depending upon which of the inner cam surface is cooperating with the inner race. Through the use of a selector ring to bias the individual sprags, it is possible to selectively reverse the direction of torque transmission to the clutch and allow "freewheeling" in the opposite direction.

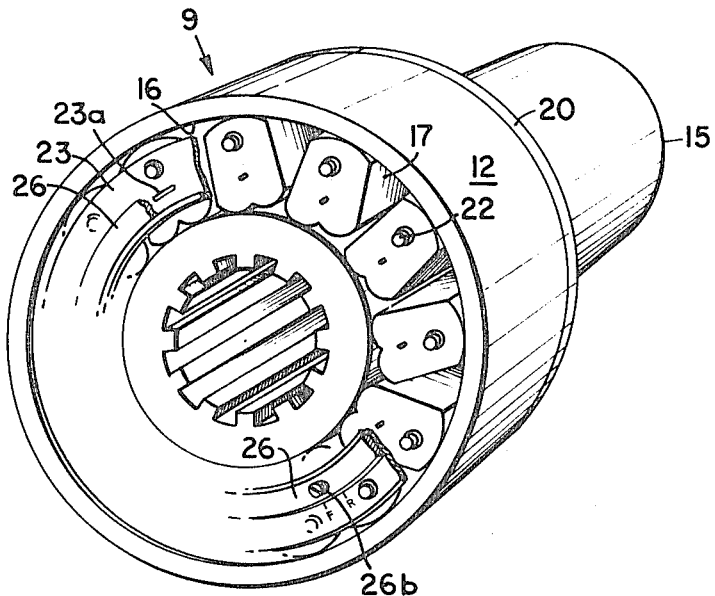
FIG_1
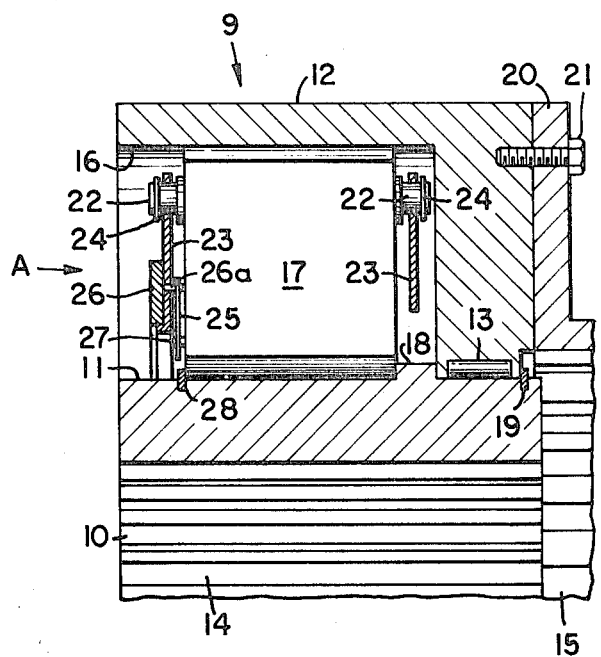
FIG_2
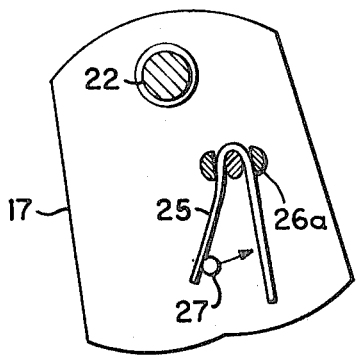
FIG_3
INVENTOR.
DAVID N. SEDERQUIST
BY
ATTORNEYS

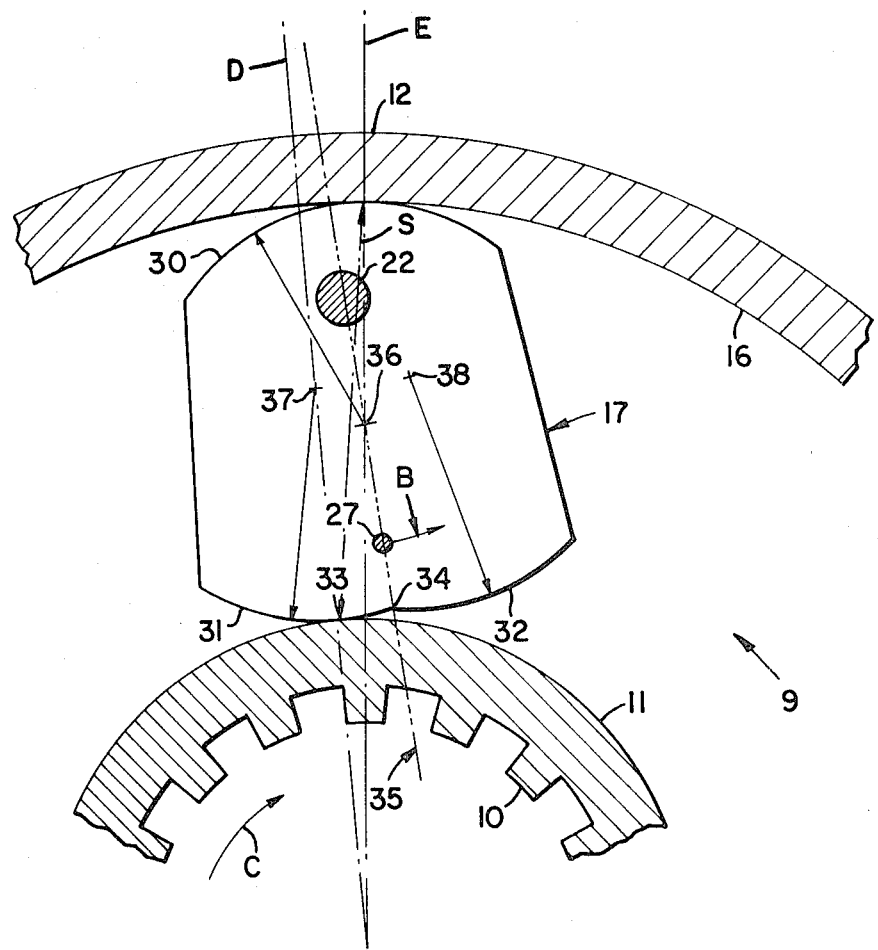
FIG_4

3,599,767

REVERSIBLE SPRAG CLUTCH

BACKGROUND OF THE INVENTION

A number of different types of rudimentary clutches are employed in machinery wherein only unidirectional torque transmission is required or desired. Typical of these clutches are those employed as overrun clutches and the like in various machines. Construction of these clutches often employs rollers and sprags, balls, etc. which allow one of two associated concentric parts of the clutch to run freely relative to the other in one rotational direction but will grip or lock these concentric parts as a unit instantaneously when the direction of rotation is reversed.

Most common of these types of rudimentary clutches are those employing a plurality of rollers or balls contained in an opening between two associated concentric members wherein one of the opposed surfaces includes a plurality of ramp surfaces cooperating with the rollers or balls. If the relative rotation between the concentric parts is attempted in one direction, the rollers or balls will "roll" up the ramp and wedge between the surfaces locking or coupling the members together as a unit. However, if the relative rotation is reversed the rollers or balls will not be driven into wedging engagement between the adjacent surfaces and therefore rotation of the members relative to one another in this direction can be freely accomplished.

Spray clutches, which are a variation of the roller or ball clutches previously described, include cam surfaces on a sprag member which will effect the wedging action in one direction but not in the other. Depending upon a number of mechanical parameters, the design of these sprags will vary in order to meet the particular torque requirements in a specific machine or device.

A common distinguishing feature of these rudimentary clutches is that they only allow unidirectional torque transmission and therefore are unsuitable where the direction of torque transmission may selectively change from one rotational direction to the other. Under such situations the prior art sprag clutches could not be employed without removing them from their connection and reversing them so that the inputs and outputs would be reversed relative to their connection in the machine. Such an operation is both time consuming and laborious.

The primary objective of the instant invention is a provision of a novel selectively reversible sprag clutch which the direction of torque transmission to the clutch can be conveniently and simply reversed.

Another object is the provision of the selectively reversible sprag clutch which can be produced as economically as unidirectional spray clutches.

It is also an object of the current invention to provide a reversible sprag clutch which is small and compact and does no require a large number of parts for its reversing feature.

SUMMARY OF THE INVENTION

The above objects and advantages can be accomplished with a selectively reversible sprag clutch which includes an inner cylindrical member having a peripheral circular surface forming an inner race, an outer concentric ring member surrounding said inner cylindrical member in a spaced relationship to provide annular space therebetween with an opposed circular surface forming an outer race, and a plurality of sprags circumferentially disposed in the annular space between the inner and outer races with each of said sprags having an arcuate outer cam surface and two distinct inner arcuate cam surfaces whereby the outer cam surface can cooperate with one of the inner cam surfaces to transmit torque in a clockwise direction and can also cooperate with the other inner cam surface to transmit torque in a counterclockwise direction. The sprags are commonly biased in a circular direction to achieve appropriate interaction of the respective pairs of cam surfaces so that the direction of torque interchanged between the two respective concentric members can be selected.

BRIEF DESCRIPTION OF THE DRAWING

The current invention will be better understood from the following detailed description of a preferred embodiment read in conjunction with the attached drawings in which:

FIG. 1 is a perspective view of the selective reversible sprag clutch with parts broken away to illustrate its construction;

FIG. 2 is an elevation shown in section of the sprag clutch illustrated in FIG. 1;

FIG. 3 is an end elevation of a sprag showing a torque-reversing spring; and

FIG. 4 is an end elevation of one of the sprag members showing the development of its cam surfaces and the interaction of these surfaces with the inner race and the outer race through control of which the transmission of torque through the clutch can be selectively changed.

DESCRIPTION OF A PREFERRED EMBODIMENT

Referring now to FIGS. 1 and 2 of the drawings, the design and details of the selectively reversible sprag clutch 9 are illustrated. It consists of an inner cylindrical member 10 having a peripheral circular race 11 and a concentric outer ring member 12 which are journaled together with needle bearings 13 so the inner cylindrical member and the outer ring member are free to rotate relative to one another about a common axis. In the embodiment illustrated, the inner cylindrical member includes a female spline 14 which accepts one of the spline shafts of the machine and the outer ring member has a similar female spline 15 which accepts another shaft of the machine between which shafts torque interchange is selectively desired in alternate directions while allowing declutching in the opposite direction.

The outer ring member 12 includes an internal circular race 16 which is disposed in a radial registry around the circular inner race 11 of the inner cylindrical member 10 as illustrated in FIGS. 1 and 2, thereby forming an annular opening or space between these two circular races. Torque interchange between the respective members is accomplished by inserting a plurality of sprag means 17 between the spaced apart concentric races which will wedge only when relative rotation between the concentric members is attempted in one direction but not when the direction is reversed when biased one way and provide the reverse operation when the bias is reversed. By biasing inner ends of the sprag means in a common circular direction or reversing the direction of the bias, the direction of torque transmissions through the clutch can be selectively reversed. Further, by circumferentially disposing a plurality of the sprag means in the annular space between concentric races, the radial forces developed by the wedging actions of the individual sprag members will be offset by those developed by a diametrically disposed sprag means which allows the inner and outer races to maintain concentricity during torque interchange between the respective cylindrical members of the clutch.

In the embodiment illustrated in FIG. 2, a shoulder 18 on the inner cylindrical member 10 abuts on a surface of the outer ring member 12 adjacent to the needle bearing 13 and a snapring 19 on the opposite sides of the needle bearing locks these two concentric members against axial movement. Through the needle bearing, the several parts of the clutch can rotate relative to one another about a common axis. A circular flange 20 carrying the female spline 15 is attached to the outer ring member 12 with bolts 21. It should be appreciated that the illustration of the clutch in the drawings is a very elementary embodiment and is not designed to accept very large bending loads along the rotational axis since such loads could effect the concentricity of the races. The drawings, however, illustrate the features of the invention, and the number of bearings and their location can be varied for specific applications.

The construction and principle cam contours of each of the individual sprag means 17 is best illustrated in FIG. 4. It should be appreciated that the axial length of these sprag means can vary depending upon the torque parameters to be transmitted in the clutch system. Of course, in the instant reversible sprag clutch, torque capacity is limited by the hertz stresses, as it is in prior art sprag clutch designs, wherein the torque carried by the clutch is equal to the sum of the tangential loads carried by each sprag times the moment arm of each sprag. See "Automotive Sprag Clutches—Design and Application" by E. A. Ferris S.A.E. Library 208 p. 12, June, 1960.

For the purposes of illustration, each sprag means 17 is equipped with central stepped pins 22 adjacent their outer cam surface as best shown in FIGS. 1 and 2. These stepped pins are received in circumferentially spaced bores in phasing rings or cages 23 on opposite sides of the sprags and are retained with snap rings 24 on outboard ends of the stepped pins. This illustrates one simple type of phasing ring or cage which can be employed to maintain the proper circumferential spacing between the tops of the individual sprag means for uniform torque load distribution.

Biasing of each of the sprag means for reversing the clutch is accomplished by a plurality of U-shaped springs 25 best shown in FIG. 3 mounted on a selector ring 26 which is mounted on the front phasing ring or cage so that it can be turned between two positions, F and R. Turning the selector ring will cause one or the other leg of the U-shaped springs carried on supports 26a extending through slots 23a in the front phasing cage to engage a projecting stop 27 on the outer radial face end of its associated sprag means, as illustrated in FIGS. 1 and 2, through which contact the contacting spring leg will urge the bottom end of its associated sprag means to cause one of the inner cam surfaces of the sprag means to come into contact with the inner race 11 as the sprag means rotates about the axis of its stepped pins 22 in the phasing ring or cage. A setscrew 26b locks the selector ring to the phasing cage in one of its two positions.

Thus, by twisting the selector ring 26 on the phasing ring or cage each of the U-shaped springs will bias its associated sprag means in a common direction to select the direction of torque transmission through the reversible sprag clutch. After the sprag means are secured in the phasing ring or cages, this assembled unit is inserted in the annular opening A so that the inner edges of the sprag means abut on radial shoulder 18 and thereafter a snap ring 28 is employed on the inner race 11 against the front faces of the sprag means retaining them between the snapring and the shoulder 18 to prevent axial movement of this assembled unit.

By referring to FIG. 4, the actual development of the outer cam surface 30 and the inner cam surfaces 31 and 32 are better illustrated wherein the sprag means 17 biased in the direction of the arrow B so that relative rotation of the inner race 11 to the outer race 16 in the direction of arrow C cannot occur due to the "wedging action" or camming of the sprag means between the outer and inner races 16 and 11, respectively. However, since the inner cam surface 31 has a decreasing lever arm or strut from its drive point 33 (contact with the inner race) to the centerline 35 of the sprag means, a reversal of direction, opposite to arrow C, will not result in any wedging action when the bias on the sprag means in the direction of the arrow B is maintained. As a result, freewheeling can occur in this latter, counterclockwise, direction. Of course, if the sprag is rotated about pins 22 so that its other inner cam surface 32 is biased toward inner race 11 by the U-shaped spring, the direction of torque transmission will be reversed and freewheeling will occur in the opposite or clockwise direction since the operation is the same due to the symmetry of the sprag means on opposite sides of their centerlines. Since the reversing torque through the clutch can be simply accomplished, the clutch is ideally suited for replacing ratchet drives in socket tools where it is desirable to reduce the lost motion in a reversible drive.

More specifically, the basic geometry sprag design requires inner and outer cam surfaces of a sprag be developed from two spaced apart eccentric radii with the so-called horizontal eccentricity being the most important single dimension. If two lines D and E are drawn from rotational axis of the two races through the center of the several radii determining the active inner and outer cam surfaces, it determines the contact points of the cam surfaces with the several races. If a line is drawn between these two contact points, it can be considered a strut S. Relative movement between the inner and outer races will cause the sprag to rotate, toward an increasing or decreasing strut length. The races will lock if toward an increasing strut length and freewheel if toward a decreasing strut length. Through the novel design of the instant invention, two inner active cam surfaces are provided which can be alternately employed.

Referring to FIG. 4, it can be seen that the sprag means 17 includes two symmetrical halves on opposite sides of a centerline 35, one of which is reversed or a mirror image of the other. As a result, the outer cam surface 30 may be developed by a single arc having a center 36 in the midportion of the sprag means. One inner cam surface 31 developed by an arc having its center at point 37 and the other inner cam surface 32 developed by an arc having its center at point 38. It should be noted the center points of the arcs forming the inner cam surfaces 31 and 32 respectively are offset (horizontal eccentricity) from the centerline so that a common intersection point between the inner arcs will be on centerline 35. Thus, the strut of each inner cam surface will decrease as frictional drag urges it toward the centerline of the sprag means allowing "freewheeling." The actual design and curvature of the respective cam surfaces can vary considerably and are not limited to the specific design shown. More sophisticated sprags will include other compensating radii selections which can be selected to meet design parameters required for the specific application.

What I claim is:

1. A selectively reversible sprag device comprising:

a first member having a race;

a second member supported in spaced relationship from said first member and having an opposed race;

a plurality of sprag means between said race and said opposed race, each of said sprag members having a single arcuate cam surface at one end and two arcuate cam surfaces at their opposite end with said two arcuate cam surfaces having horizontal eccentricity with respect to said single arcuate cam surface at said one end; and biasing means operably associated with said plurality sprag means to urge them selectively in one of two common directions whereby said single arcuate cam surface of each sprag means and one of its two arcuate cam surfaces at its opposite end will restrict relative movement of said first and second member in one direction and said single arcuate cam surface of each sprag means and the other of its two arcuate cam surfaces at its opposite end will restrict relative movement of said first and second members in the opposite direction depending on the direction of biasing means.

2. A selectively reversible sprag clutch comprising:

a first member having an inner circular race;

a second member rotatably journaled with said first member for rotation about a common concentric axis, said outer member having an outer circular race disposed in radial registry with said inner circular race and in a spaced relationship forming an annular opening between said concentric races;

a plurality of sprag means circumferentially disposed in said annular opening, each of said sprag means having an outer arcuate cam surface and two inner arcuate cam surfaces, each of said inner cam surfaces having horizontal eccentricity with their outer arcuate cam surface; and biasing means selectively engaging said plurality of sprag means and urging them in one of two common directions, whereby a common inner arcuate cam of every sprag means cooperates with its outer cam surface to effect torque interchange between said first and second member through said races in one rotational direction and the opposite inner arcuate cam surface of every sprag means cooperates with its outer cam surface to effect torque interchange between said first and second members in an opposite rotational direction depending on the direction of bias of said biasing means.

3. A selectively reversible sprag clutch as defined in claim 2 wherein the plurality of sprag means are arranged so each sprag means is complemented by a diametrically positioned sprag means.

4. A selectively reversible sprag clutch as defined in claim 2 wherein cage means are associated with the plurality of sprag means to maintain them at equally spaced circumferential intervals in the annular opening between the concentric races.

5. A selectively reversible sprag clutch as defined in claim 4 wherein the cage means includes an associated selector means operable to selectively change the direction of bias of the biasing means.

6. A selectively reversible sprag clutch as defined in claim 2 wherein each sprag means is semisymmetrical with one of its two inner arcuate cam surfaces being a mirror image of the other.

7. A selectively reversible sprag clutch as defined in claim 5 wherein springs associated with each sprag means and the selector means form part of the biasing means.

8. A selectively reversible sprag clutch as defined in claim 2 wherein the first member includes coupling means for coupling it to a first shaft and the second member includes coupling means for connecting it to a second shaft coaxial with said first shaft.